United States Patent

Prechtl et al.

(10) Patent No.: US 6,712,992 B2
(45) Date of Patent: Mar. 30, 2004

(54) LIQUID-CRYSTALLINE COMPOSITION OF MATTER

(75) Inventors: Frank Prechtl, Frankfurt (DE); Sylke Haremza, Neckargemünd (DE); Frank Meyer, Heidelberg (DE); Robert Parker, Mannheim (DE); Kathrin Kürschner, Mannheim (DE); Peter Schuhmacher, Mannheim (DE); Hans-Werner Schmidt, Bayreuth (DE); Gerold Schmitt, Darmstadt (DE); Reiner Giesa, Bayreuth (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/864,314

(22) Filed: May 25, 2001

(65) Prior Publication Data

US 2002/0031621 A1 Mar. 14, 2002

(30) Foreign Application Priority Data

May 26, 2000 (DE) .......................................... 100 25 782

(51) Int. Cl.$^7$ ............................................... C09K 19/06
(52) U.S. Cl. ............................. 252/299.6; 252/299.64; 252/299.61
(58) Field of Search .................. 252/299.01, 299.6, 252/299.61, 299.62, 299.63, 299.64, 299.65, 299.66, 299.67

(56) References Cited

U.S. PATENT DOCUMENTS

| | | | |
|---|---|---|---|
| 5,744,057 A | 4/1998 | Meyer et al. | |
| 5,780,629 A | 7/1998 | Etzbach et al. | |
| 5,798,147 A | 8/1998 | Beck et al. | |
| 5,833,880 A | 11/1998 | Siemensmeyer et al. | |
| 5,976,239 A | 11/1999 | Dannenhauer et al. | |
| 6,136,225 A | 10/2000 | Meyer et al. | |
| 6,136,251 A | 10/2000 | Etzbach et al. | |
| 6,171,518 B1 * | 1/2001 | Hikmet et al. | 252/299.01 |
| 6,395,351 B1 * | 5/2002 | Benecke et al. | 252/299.63 |

FOREIGN PATENT DOCUMENTS

| | | | |
|---|---|---|---|
| DE | 44 08 171 | 9/1995 | |
| DE | 195 20 660 | 12/1996 | |
| DE | 195 20 704 | 12/1996 | |
| DE | 197 45 647 | 4/1999 | |
| DE | 198 43 724 | 4/1999 | |
| DE | 199 05 394 | 8/2000 | |
| DE | 100 13 507 | 9/2001 | |
| EP | 0 562 681 | * 3/1993 | .......... H01L/41/193 |
| EP | 0 643 121 | 3/1995 | |
| EP | 0 704 005 | 7/1996 | |
| GB | 2 330 139 | 4/1999 | |
| WO | WO 95/16007 | 6/1995 | |
| WO | WO 96/02597 | 2/1996 | |
| WO | WO 97/00600 | 2/1997 | |
| WO | WO 97/27251 | 7/1997 | |
| WO | WO 97/27752 | 8/1997 | |
| WO | WO 98/12265 | 3/1998 | |
| WO | WO 98/47979 | 10/1998 | |
| WO | WO 99/11733 | 3/1999 | |
| WO | WO 99/37735 | 7/1999 | |
| WO | 99/37735 | * 7/1999 | .......... C09K/19/38 |

OTHER PUBLICATIONS

Chemical Abstract, AN 2000–602928/58, DE 199 05 394, Aug. 17, 2000.

* cited by examiner

Primary Examiner—Mark F. Huff
Assistant Examiner—Jennifer R. Sadula
(74) Attorney, Agent, or Firm—Oblon, Spivak, McClelland, Maier & Neustadt, P.C.

(57) ABSTRACT

Liquid-crystalline compositions containing, as components,

A) at least one compound of the formula I $$Z^1—Y^1—A^1—Y^3—M—Y^4—A^2—Y^2—Z^2 \quad (I),$$

where $Z^1$ and $Z^2$ are each a reactive group, $Y^1$ to $Y^4$ are each a linking unit, $A^1$ and $A^2$ are each a spacer and M is a mesogenic group, B) at least one reactive compound selected from b1) vinyl or allyl ethers, b2) vinyl or allyl esters of saturated or unsaturated carboxylic acids, b3) methacrylic or acrylic esters of monofunctional or polyfunctional alcohols, b4) polyester (meth)acrylates, b5) vinylaromatics or vinylheteroaromatics, and b6) compounds of the general formula II $$CH_2=CH—NR^2—R^1 \quad (II),$$

in which $R^1$ and $R^2$ are as defined in detail in the description, and

C) if desired further additives.

14 Claims, No Drawings

LIQUID-CRYSTALLINE COMPOSITION OF MATTER

The present invention relates to a liquid-crystalline composition of matter comprising as components, A) at least one compound of the formula I

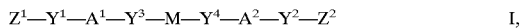

where the variables, independently of one another, have the following meanings:
$Z^1$ and $Z^2$ are each a reactive group,
$Y^1$ to $Y^4$ are each a linking unit,
$A^1$ and $A^2$ are each a spacer, and
M is a mesogenic group, B) at least one reactive compound selected from the group consisting of the subgroups
b1) vinyl or allyl ethers,
b2) vinyl or allyl esters of saturated or unsaturated carboxylic acids,
b3) methacrylic or acrylic esters of monofunctional or polyfunctional alcohols,
b4) polyester (meth)acrylates,
b5) vinylaromatics or vinylheteroaromatics, and
b6) compounds of the general formula II $$CH_2=CH-NR^2-R^1 \qquad II,$$

in which $R^1$ and $R^2$ are as defined in detail in the description, and

C) if desired, further additives.

The present invention further relates to the use of the compositions of matter of the invention for producing optical components, for printing or coating substrates, for producing dispersions and emulsions, films and pigments.

The present invention further relates to optical components, printed or coated substrates, dispersions and emulsions, films and pigments which have been produced using the compositions of matter according to the invention.

The preparation of cholesteric liquid-crystal mixtures usually involves using a liquid-crystalline (nematic) base material and one or more optically active dopants.

Despite process optimizations, including the selection of suitable and inexpensive raw materials, the preparation of liquid-crystalline base materials remains generally complicated and costly. The same applies, usually to a far greater extent, to the preparation of chiral dopants, typically involving the use of enantiomerically poor starting materials and possibly requiring a costly post-purification of the raw product obtained.

It is an object of the present invention to provide modified liquid-crystalline base materials, if desired in a mixture with chiral dopants, which base materials can be prepared more economically and whose optical properties are at least as good as or even better than the unmodified base materials.

We have found that, surprisingly, this object is achieved by liquid-crystalline compositions of matter obtained by mixing the liquid-crystalline (doped or undoped) base materials with the polymerizable compounds of the subgroups b1) to b6) mentioned at the beginning.

The present invention therefore provides a liquid-crystalline composition of matter comprising, as components, A) at least one compound of the formula I

where the variables, independently of one another, have the following meanings:
$Z^1$ and $Z^2$ are each a reactive group,
$Y^1$ to $Y^4$ are each a chemical single bond, oxygen, sulfur, —O—CO—, —CO—O—, —O—CO—O—, —CO—NR—, —NR—CO—, —O—CO—NR—, —NR—CO—O— or —NR—CO—NR—,
R is hydrogen or $C_1$–$C_4$-alkyl,
$A^1$ and $A^2$ are each a spacer having from 1 to 30 carbon atoms, in which the carbon chain may be monosubstituted or polysubstituted by methyl, fluorine, chlorine or bromine and/or interrupted by ether oxygen, thioether sulfur or non-adjacent imino or $C_1$–$C_4$-alkylimino groups, and
M is a mesogenic group, B) at least one reactive compound selected from the group consisting of the subgroups
b1) vinyl or allyl ethers,
b2) vinyl or allyl esters of saturated or unsaturated carboxylic acids,
b3) methacrylic or acrylic esters of monofunctional or polyfunctional alcohols,
b4) polyester (meth)acrylates,
b5) vinylaromatics or vinylheteroaromatics, and
b6) compounds of the general formula II $$CH_2=CH-NR^2-R^1 \qquad II,$$

where:

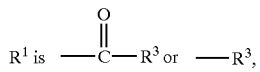

$R^2$ is hydrogen, $C_1$–$C_4$-alkyl or, together $R^3$, a saturated or unsaturated $C_3$-, $C_4$- or $C_5$-alkylene bridge, in which up to two $CH_2$ groups may be replaced by NH, $N(C_1$–$C_4$-alkyl), $N(C_6$–$C_{10}$-aryl) or oxygen and up to two CH groups may be replaced by N, and
$R^3$ is hydrogen, $C_1$–$C_4$-alkyl or a radical which, together with $R^2$, forms a saturated or unsaturated $C_3$-, $C_4$- or $C_5$-alkylene bridge, in which up to two $CH_2$ groups may be replaced by NH, $N(C_1$–$C_4$-alkyl), $N(C_6$–$C_{10}$-aryl) or oxygen and up to two CH groups may be replaced by N, and C) if desired, further additives.

Suitable spacers $A^1$ and $A^2$ are all groups known for this purpose to a person skilled in the art. The spacers usually contain one to 30, preferably one to 12, particularly preferably one to six, carbon atoms and consist in particular of linear aliphatic groups. The carbon chain may be monosubstituted or polysubstituted by methyl, fluorine, chlorine or bromine and/or interrupted by ether oxygen, thioeher sulfur or non-adjacent imino or $C_1$–$C_4$-alkylimino groups.

Examples of representative spacers are:

—(CH$_2$)$_u$—, —(CH$_2$CH$_2$O)$_v$CH$_2$CH$_2$—,

—CH$_2$CH$_2$SCH$_2$CH$_2$—,

—CH$_2$CH$_2$NHCH$_2$CH$_2$—,

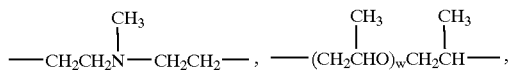

-continued

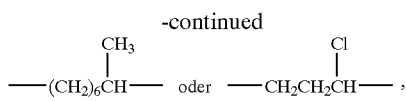

where u is 1 to 30, preferably 1 to 12, v is 1 to 14, preferably 1 to 5, and w is 1 to 9, preferably 1 to 3.

Preferred spacers are ethylene, propylene, n-butylene, n-pentylene and n-hexylene.

Mesogenic groups M can be all suitable mesogenic groups known to a person skilled in the art.

Particularly suitable mesogenic groups are those of the formula Ia $$(-T-Y^5)_r-T- \qquad \text{Ia}$$

where

T at each occurrence is a divalent, saturated or unsaturated carbocyclic or heterocyclic radical $Y^5$ is a chemical single bond, oxygen, sulfur, —CO—, —O—CO—, —CO—O—, —O—CO—O—, —CO—NR—, —NR—CO—, —O—CO—NR—, —NR—CO—O— or —NR—CO—NR— and r is 0, 1, 2 or 3, where, if r>0, both T and $Y^5$ can be identical or different at each occurrence.

The radicals T may be ring systems which are substituted by fluorine, chlorine, bromine, cyano, hydroxyl, formyl, nitro, $C_1$–$C_{20}$-alkyl, $C_1$–$C_{20}$-alkoxy, $C_1$–$C_{20}$-alkoxycarbonyl, $C_1$–$C_{20}$-monoalkylaminocarbonyl, $C_1$–$C_{20}$-alkylcarbonyl, $C_1$–$C_{20}$-alkylcarbonyloxy or $C_1$–$C_{20}$-alkylcarbonylamino. Preferred radicals T are:

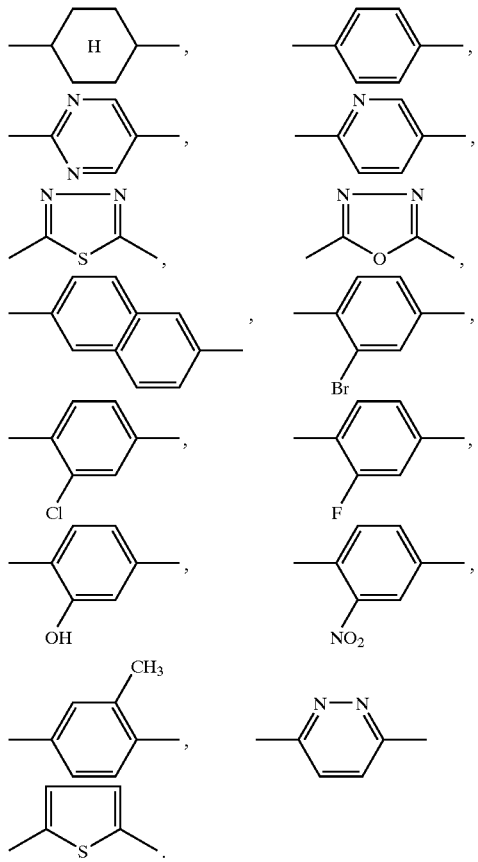

Examples of mesogenic groups M are:

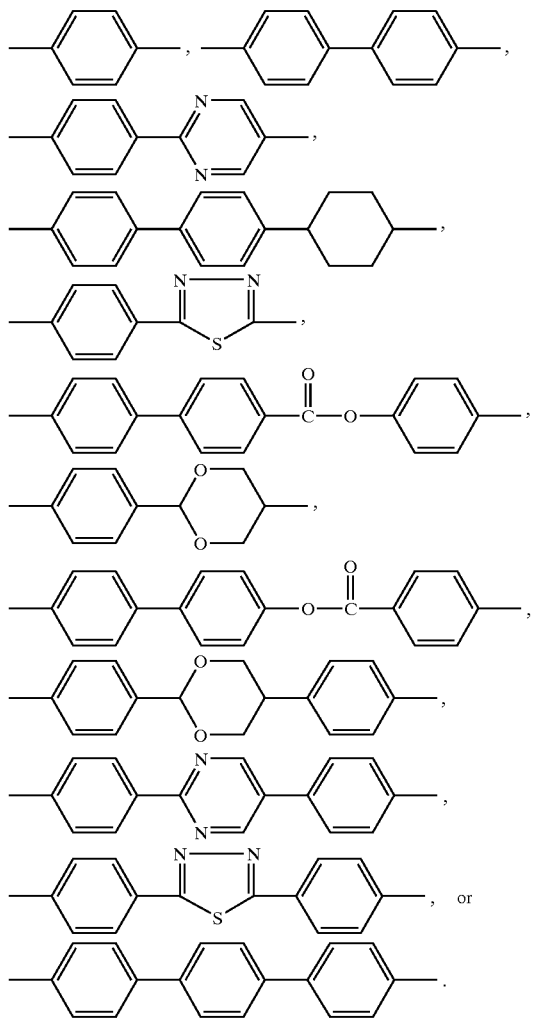

Further possible mesogenic groups M correspond to the following formulae:

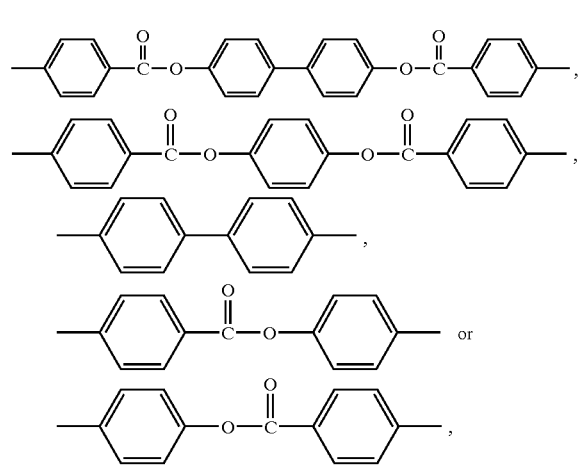

In accordance with the above examples for possible radicals T, the (unsubstituted) mesogenic groups shown above may of course be substituted by fluorine, chlorine, bromine, cyano, hydroxyl, formyl, nitro, $C_1$–$C_{20}$-alkyl, $C_1$–$C_{20}$-alkoxy, $C_1$—$C_{20}$-alkoxycarbonyl, $C_1$–$C_{20}$-monoalkylcarbonyl, $C_1$–$C_{20}$-alkylcarbonyl, $C_1$—$C_{20}$-alkylcarbonyloxy or $C_1$–$C_{20}$-alkylcarbonylamino. Preferred substituents are in particular short-chain aliphatic radicals, such as methyl, ethyl, n-propyl, i-propyl, n-butyl, i-butyl, sec-butyl, tert-butyl and alkoxy, alkoxycarbonyl, alkylcarbonyl, alkylcarbonyloxy, alkylcarbonylamino and monoalkylaminocarbonyl radicals which contain these alkyl groups.

Example of reactive groups $Z^1$ and $Z^2$ are:

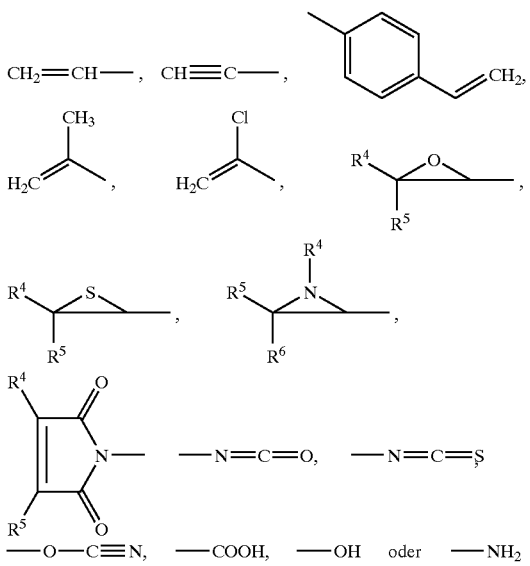

where the radicals $R^4$ to $R^6$ can be identical or different and are each hydrogen or $C_1$–$C_4$-alkyl, such as methyl, ethyl, n-propyl, isopropyl, n-butyl, isobutyl, sec-butyl or tert-butyl. In the case of the maleimido group and the groups —N=C=O, —N=C=S, —O—C≡N, —COOH, and —OH and —NH$_2$, the linking units $Y^1$ and/or $Y^2$ represent a chemical single bond.

Of the reactive groups, the cyanates can spontaneously trimerize to cyanurates. The other groups mentioned require further compounds (of the formula I or other auxiliary compounds) containing complementary reactive groups for polymerization. Thus, for example, isocyanates can polymerize with alcohols to give urethanes and with amines to give urea derivatives. Thiiranes and aziridines behave similarly. Carboxyl groups can be condensed to give polyesters and polyamides. The maleimido group is particularly suitable for free-radical copolymerization with olefinic compounds, for example styrene, or compounds comprising styrene structural elements.

The reactive groups may, together with the corresponding complementary reactive groups, be present in a single compound of the formula I (so that this compound may potentially polymerize with itself) or in an additional compound of the formula I. Alternatively, these reactive groups may, together with the corresponding complementary reactive groups, be present in a single auxiliary compound or in further auxiliary compounds of this type not according to formula I. Examples of the latter are polyhydric (amino) alcohols which can react with possible isocyanate groups of a compound of the formula I.

Particularly suitable reactive groups are 1-methylvinyl and vinyl, and in particular, together with $Y^1$ or $Y^2$ being —CO—O— or —O—CO—, methacrylate and acrylate.

Particularly preferred compounds of the formula I have the following structure

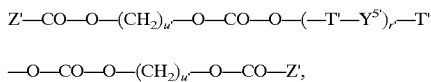

where u' has identical values of 2, 3, 4, 5 or 6,

Z' represents identical radicals 1-methylvinyl or vinyl

T' is unsubstituted or $C_1$–$C_{20}$-alkyl-substituted 1,4-phenylene and $Y^{5'}$ is —O—CO— or —CO—O— and r' is 1 or 2, the radicals T' being identical or different.

Particularly the mesogenic groups (—T'—$Y^{5'}$)$_{r'}$—T'— are the following groups:

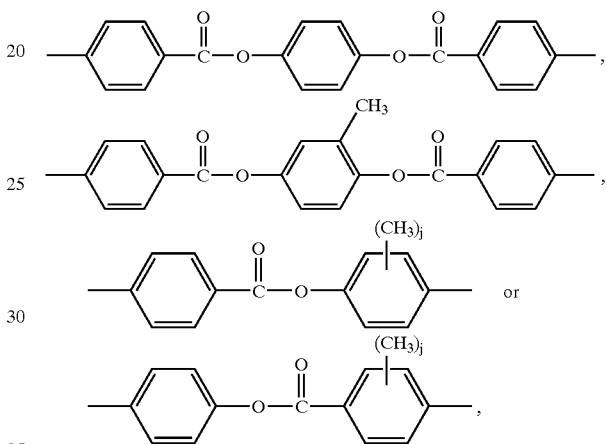

where j is 0 or 1.

Reactive compounds of subgroup b1) include vinyl or allyl ethers of monofunctional alcohols, for example of lauryl, myristyl, palmityl or stearyl alcohol, but also divinyl or diallyl ethers of bifunctional alcohols, such as ethylene glycol and butane-1,4-diol.

Reactive compounds of subgroup b2) include vinyl or ally esters of carboxylic acids, such as lauric, myristic, palmitic or stearic acid, or of dicarboxylic acids, such as succinic acid and adipic acid.

Reactive compounds of subgroup b3) include methacrylic or acrylic esters of monofunctional or polyfunctional alcohols, in particular those which other than the hydroxyl group(s) contain no other functional groups, or only ether groups if any. Examples of such alcohols are bifunctional alcohols such as ethylene glycol, propylene glycol, and their more highly condensed counterparts, such as diethylene glycol, triethylene glycol, dipropylene glycol, tripropylene glycol etc., butanediol, pentanediol, hexanediol, neopentyl glycol, alkoxylated phenolic compounds, such as ethoxylated or propoxylated bisphenols, cyclohexanedimethanol, alcohols having a functionality of three or more, such as glycerol, trimethylolpropane, butanetriol, trimethylolethane, pentaerythritol, ditrimethylolpropane, dipentaerythritol, sorbitol, mannitol, and the corresponding alkoxylated alcohols, in particular ethoxylated and propoxylated alcohols. This subgroup further includes (meth)acrylic esters of unsaturated alcohols, such as tricyclodecenyl alcohol, i.e. esters of the following structure (also known as dihydrodicyclopentadienyl acrylate)

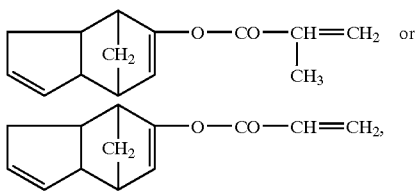

and acrylic, methacrylic and cyanoacrylic esters of allyl alcohol.

The polyester (meth)acrylates of subgroup b4) are (meth) acrylic esters of polyesterols. Polyesterols are compounds resulting from esterifying polycarboxylic acids with polyols. The starting materials for such hydroxyl-containing polyesters are known to the person skilled in the art. Suitable carboxylic acids are succinic acid, glutaric acid, adipic acid, sebacic acid, o-phthalic acid and isomers thereof, and hydrogenation products and esterifiable or transesterifiable derivatives thereof, such as anhydrides or dialkyl esters, and suitable polyols are the alcohols mentioned in subgroup b3), preferably ethylene glycol, 1,2- and 1,3-propylene glycol, 1,4-butanediol, 1,6-hexanediol, neopentyl glycol, cyclohexanedimethanol and polyglycols of the ethylene glycol and propylene glycol type.

Subgroup b5) includes, for example, 9-vinylcarbazole, styrene, α-methylstyrene, isomers and (industrially produced) isomer mixtures of nitrostyrene, styrenesulfonic acid, vinyltoluene, divinylbenzene, vinylaniline and vinylphenol. This subgroup furthermore comprises isomers and (industrially produced) isomer mixtures of vinylpyridine or methylvinylpyridine. In particular, 2- and 4-vinylpyridine and 2-methyl-5-vinylpyridine are industrially significant. Another representative of this subgroup is triallyl cyanurate.

b6) includes, for example, N-vinylformamide, N-vinyl-2-pyrrolidone and N-vinyl-ε-caprolactam. In accordance with formula II, $R^1$ is —CO—$R^3$ in all compounds. In the former compound, $R^3$ and $R^2$ are each hydrogen, whereas in the latter two compounds $R^3$ forms together with $R^2$ a saturated $C_3$- or $C_5$-alkylene bridge.

The component B used preferably comprises at least one compound selected from the group consisting of the subgroups b3), b5) and b6), particularly preferably selected from the group consisting of the subgroups b5) and b6).

Particular examples are styrene, N-vinylformamide, 2- and 4-vinylpyridine and 2- and 4-divinylbenzene.

The reactive compounds (component B) are usually employed in a proportion of about 0.5 to 30.0, in particular 4.0 to 20, % by weight, based on the total weight of components A), B) and, if present, C) of the liquid-crystalline composition of matter. It should be noted that these limits are merely indicative. It is important that no phase separation occurs, i.e. a homogeneous liquid-crystalline phase is present. The phase boundaries can usually be determined by simple preliminary experiments.

Component A) of preferred liquid-crystalline compositions of matter comprises at least one compound of formula I where $Z^1$ and/or $Z^2$ are photopolymerizable groups. Particularly suitable are, as mentioned above, 1-methylvinyl and vinyl and, together with $Y^1$ or $Y^2$ representing —CO—O— or —O—CO—, methacrylate and acrylate as $Z^1$—$Y^1$— or —$Y^2$—$Z^2$. These compositions of matter particularly preferably comprise, as further additive (component C)), at least one photoinitiator.

Such photoinitiators are commercially available, for example, under the tradenames Lucirin® (from BASF Aktiengesellschaft, Ludwigshafen, Germany), Irgacure® and Darocure® (both from Ciba Specialty Chemicals). Preference is given to using the initiators Lucirin® TPO, Irgacure® 184, Irgacure® 369, Irgacure® 907 and Darocure® 1173.

The photoinitiator(s) is(are) usually employed in a proportion of about 0.5 to 5.0% by weight, based on the total weight of components A), B) and C) of the composition of matter according to the invention.

Further preferred compositions of matter furthermore comprise at least one chiral compound as component C).

In particular, these chiral compounds correspond to the general formulae Ib to Ie

  Ib,

  Ic,

  Id,

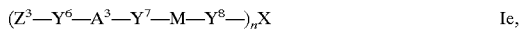  Ie, where the variables $Z^3$ are reactive groups, $Y^6$ to $Y^8$ are linking units, $A^3$ are spacers and M are mesogenic groups and which have the same general meaning as the variables $Z^1$ and $Z^2$, $Y^1$ to $Y^5$, $A^1$ and $A^2$ and M in the formulae I and Ia. n is 1, 2, 3, 4, 5 or 6 and X is the corresponding n-valent chiral radical. The n groups attached to the chiral radical X may be identical or different.

Possible radicals X are, for example:

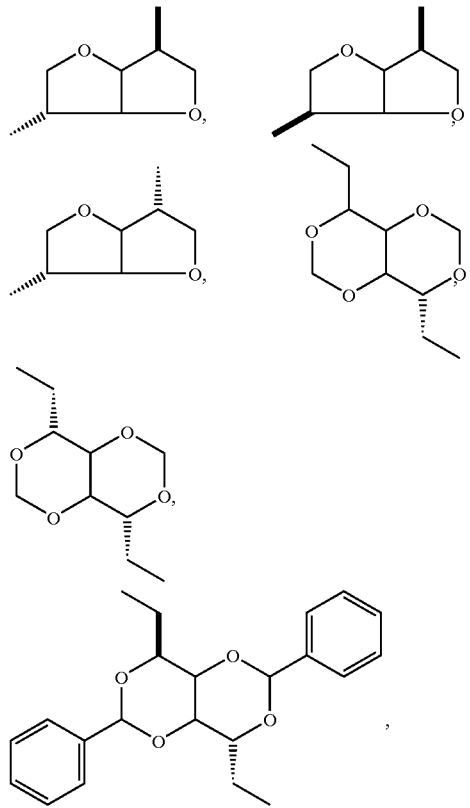

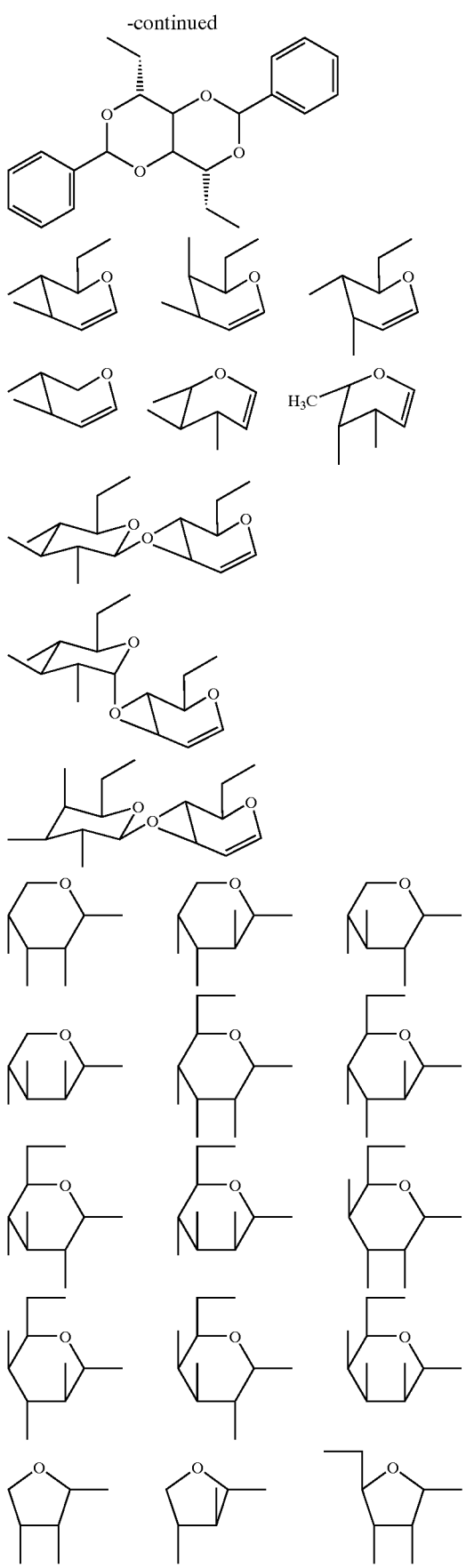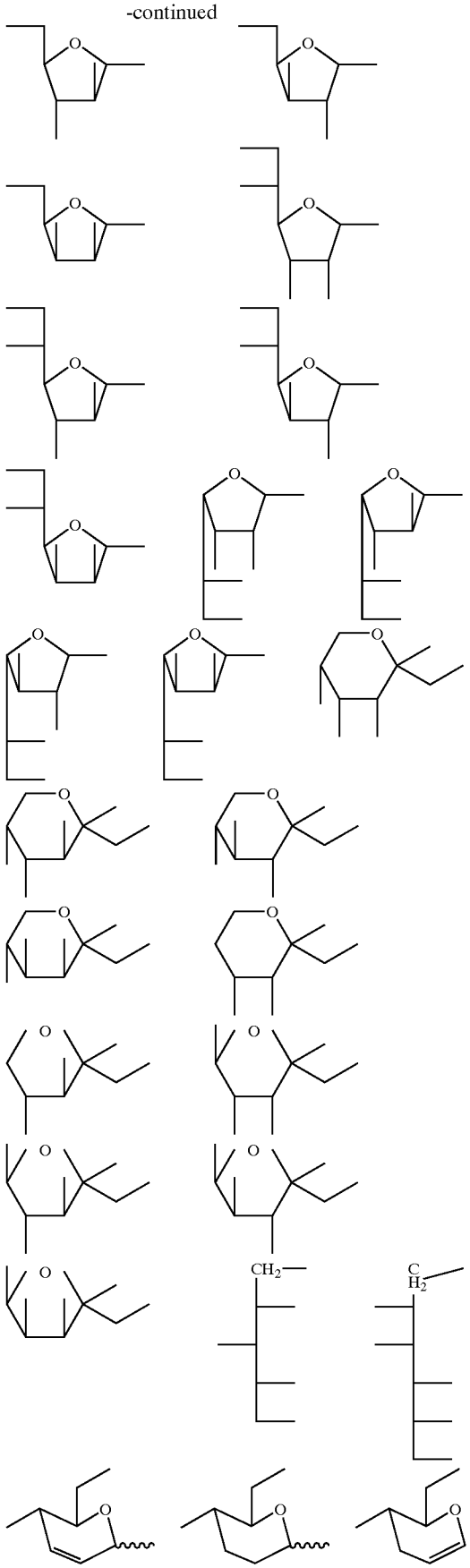

-continued

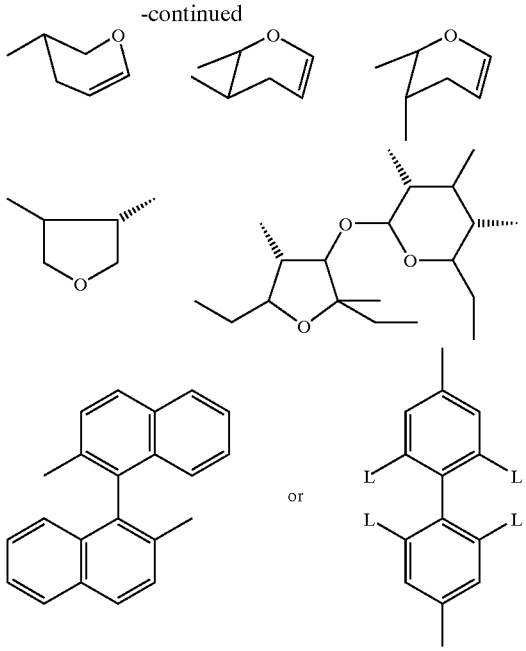

where
L is R, RO, COOR, OCOR, CONHR or NHCOR, halogen, in particular fluorine, chlorine or bromine, and R is $C_1$–$C_4$-alkyl, for example methyl, ethyl, n-propyl, i-propyl, n-butyl, i-butyl or tert-butyl.

X is particularly preferably:

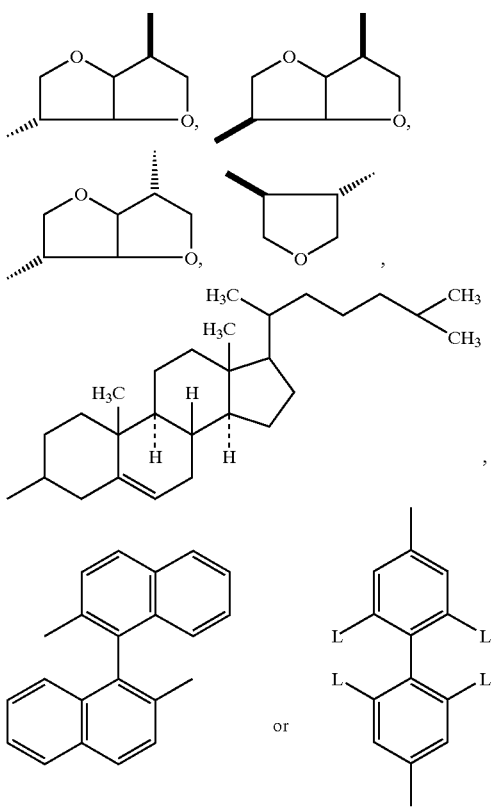

Chiral compounds containing these and further suitable chiral radicals X are mentioned, for example, in WO 95/16007, DE-A 1 95 20 660, DE-A 195 20 704, DE 198 43 724 and the earlier German Patent Application 100 13 507.2.

Particularly preferred chiral compounds have the structure shown below, in analogy with the above formula Ie:

$$[Z^{3'}\text{—CO—O—}(CH_2)_{u''}\text{—}Y^{7'}\text{—}(\text{—}T''\text{—}Y^{5''})_{r''}\text{—}T''\text{—}Y^{8'}\text{—}]_2X,$$

where u" has the identical values of 2, 3, 4, 5 or 6,
$Z^{3'}$ represents identical radicals 1-methylvinyl or vinyl
$Y^{7'}$ represents identical oxygen or —O—CO—O— linking units
$Y^{8'}$ represents identical —O—CO— or —CO—O— linking units,
T" represents unsubstituted or $C_1$–$C_{20}$-alkyl-substituted 1,4-phenylene and
$Y^{5''}$ is —O—CO— or —CO—O—,
r" has values of 0 or 1, the radicals T" being identical or different for r" equals 1, and
X in particular represents the groups mentioned above:

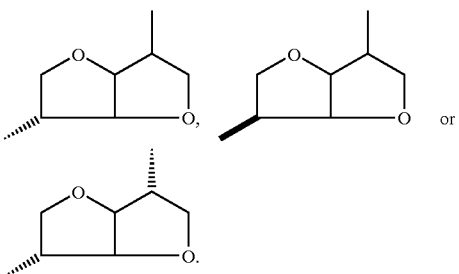

The mesogenic group (—T"—$Y^{5''}$)$_{r''}$—T"— is in particular one of the following groups:

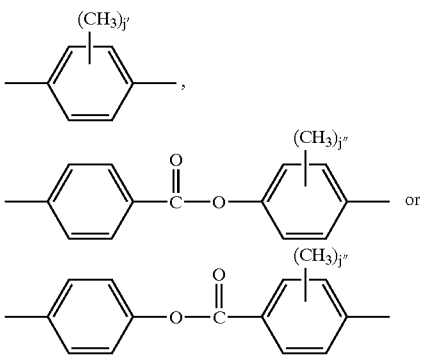

where j' and j" are each 0 or 1.

The present invention provides the use of compositions of matter of the invention for producing optical components, such as polarizers or filters.

The present invention furthermore provides such optical components which have been obtained using the compositions of matter of the invention.

The present invention furthermore provides the use of compositions of matter of the invention for printing or coating substrates. In this case, component C) may comprise further additives in addition to the above mentioned photoinitiators and chiral compounds. Suitable additives include additives selected from the group consisting of diluents, antifoams and deaerators, lubricants and flow auxiliaries, thermally curing or radiation-curing auxiliaries, substrate wetting auxiliaries, wetting and dispersion auxiliaries, hydrophobizing agents, adhesion promoters and auxiliaries for improving the scratch resistance, dyes and pigments and additives selected from the group consisting of light, heat and/or oxidation stabilizers. The chemophysical nature of these additives is described in detail in the prior German application 199 05 394.4. Accordingly, as described in the prior German application 199 05 394.4, the compositions of matter of the present application can be used as printing or coating compositions for substrates.

The present invention furthermore provides printed or coated substrates which have been produced using the compositions of matter of the invention, if desired in admixture with the above mentioned additives as component C).

Examples of such substrates are paper and cardboard products, for example for carrier bags, magazines, brochures, gift wrappings and packaging materials for consumables, food products and luxury products, sheets, for example for decorative or non-decorative packaging, textiles of any kind and leather.

Other substrates are (consumer) electronic products, such as MC, MD, DVD and video recorders, televisions, radios, telephones/mobile phones etc. and electronic data processing equipment, products from the leisure, sports, domestic and games sector, for example bicycles, children's vehicles, skis, snowboards and surfboards, in-line skates, rollerskates and ice-skates and domestic appliances. Such substrates furthermore include writing utensils and spectacle frames, for example.

Other substrates are surfaces encountered in the construction sector, such as building walls or windowpanes. In the latter case, a functional effect may be desired in addition to a decorative effect. Thus, it is possible to produce multilayers on the window material whose individual layers have different chemicophysical properties. If, for example, layers of the inventive compositions of matter doped with chiral compounds and having opposite helical twist (by use of enantiomeric chiral compounds as dopant/component C)) or individual layers of doped liquid-crystalline compositions of matter having the same helical twist but different pitch and thus different reflection properties (by using different concentrations of dopant//component C)) are applied and crosslinked, specific wavelengths or wavelength ranges of the light spectrum can be reflected in a controlled manner. In this way it is possible, for example, to provide a window coating which is IR or UV-reflective. For this aspect of the compositions of matter of the invention, in particular heat-insulating coatings, reference is made to German Offenlegungsschrift 197 45 647.

The present invention furthermore provides the use of the compositions of matter of the invention for producing dispersions and emulsions, which are preferably water-based. For the preparation of such dispersions and emulsions, reference is made to WO 96/02597 and WO 98/47979 which describe the preparation of dispersions and emulsions using liquid-crystalline materials.

Accordingly, the present invention provides such dispersions and emulsions which have been produced using the compositions of matter of the invention. These dispersions and emulsions can likewise be used for printing and coating substrates as described above by way of example.

The present invention furthermore provides the use of the compositions of matter of the invention for producing films. For the purposes of the present invention, such films are in particular self-supporting layers as obtained by polymerizing the compositions of matter. These films may be on substrates or backings such that films can easily be removed and transferred to other substrates or backings for permanent adhesion by appropriate measures. Such films can be used, for example, in film coating and laminating processes.

Accordingly, the present invention furthermore provides such films which have been produced using the compositions of matter of the invention.

The present invention furthermore provides the use of the compositions of matter or the invention for producing pigments.

The production of such pigments is known and described in detail in WO 99/11733, for example. Furthermore, it is also possible to produce pigments of predefined shape and size by using printing methods or by means of nets with gaps in which the liquid-crystalline composition is placed. The compositions are then polymerized or condensed followed by removal from the substrate or net. These procedures are described in detail in WO 96/02597, WO 97/27251, WO 97/27252 and EP 0 931 110.

These pigments may be single-layered (homogeneous) or multilayered. However, the latter pigments can usually only be obtained if coating processes are utilized in which a plurality of layers are formed successively on top of one another followed by a final mechanical communication.

Accordingly, the present invention also provides pigments which have been produced from compositions of matter of the invention.

EXAMPLES

Preliminary Remark

The influence of the chiral dopant or the nematic phase is described by the "Helical Twisting Power" ("HTP"). It is defined as:

$$HTP = \lim_{x_{ch} \to 0} \left(\frac{dp^{-1}}{dx_{ch}}\right)_{T^*} = \lim_{x_{ch} \to 0} \bar{n}\left(\frac{d\lambda_R^{-1}}{dx_{ch}}\right)_{T^*},$$

where p is the pitch of the cholesteric helix $x_{ch}$ is the mole fraction of the chiral dopant $\bar{n}$ is the mean refractive index of the cholesteric phase, a value of about 1.6 is usually assumed for liquid-crystalline phases $\lambda_R$ is the wavelength of the reflected light T* is the reduced temperature, i.e. the ratio of the measured temperature $T_M$ to the clearing point temperature $T_c$ For small $x_{ch}$ values, $p^{-1}$ and $\lambda_R^{-1}$ are, to a good approximation, linearly dependent on $x_{ch}$, so that the limit value can be replaced, to a good approximation, by the ratio itself. In this concentration range, the HTP value can be determined by a single $\lambda_R$ measurement, assuming that $\lambda_R^{-1}$ is zero for $X_{ch}=0$. The above equation therefore simplifies to:

$$HTP = \lim_{x_{ch} \to 0} \bar{n}\left(\frac{d\lambda_R^{-1}}{dx_{ch}}\right)_{T^*} \approx \bar{n}\left(\frac{d\lambda_R^{-1}}{dx_{ch}}\right)_{T^*} \approx \bar{n}\left(\frac{\Delta\lambda_R^{-1}}{\Delta x_{ch}}\right)_{T^*}$$

$$= \bar{n}\left(\frac{\lambda_R^{-1}(X_{ch}) - \lambda_R^{-1}(0)}{x_{ch} - 0}\right)_{T^*} = \bar{n}\left(\frac{\lambda_R^{-1}(X_{ch})}{x_{ch}}\right)_{T^*}$$

The following compounds were used as chiral dopants (component C)):
Dopant 1 (DS1):

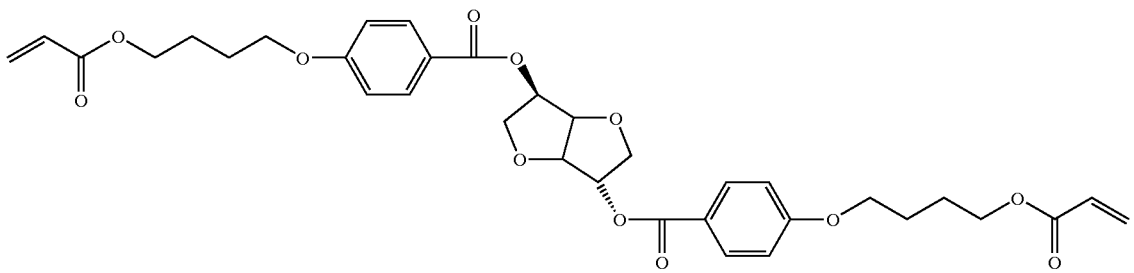

and
Dopant 2 (DS2):

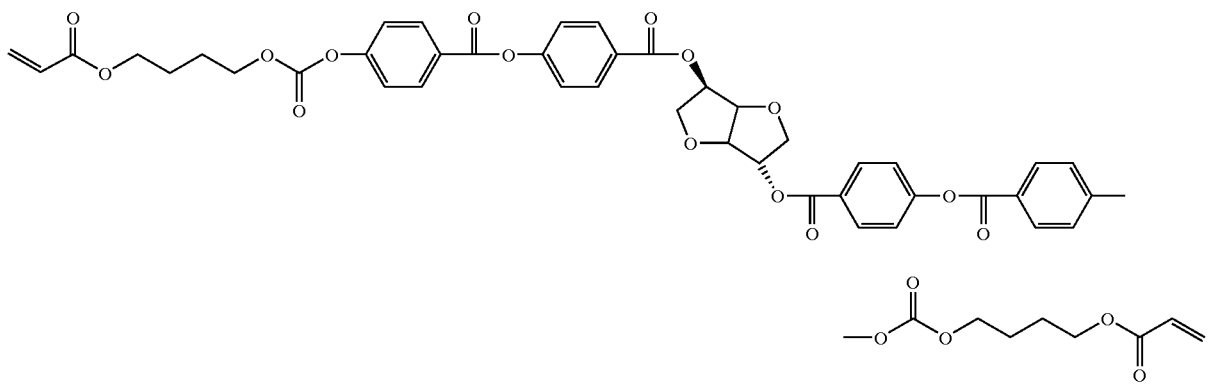

and the following compound was used as liquid-crystalline (nematic) compound (component A), LC1:

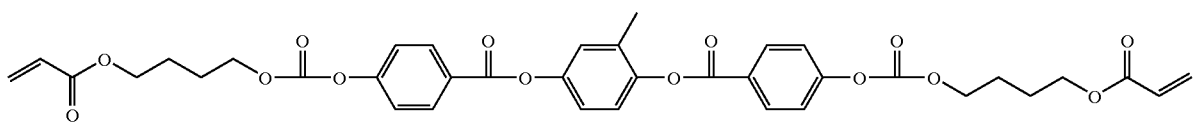

The preparation of DS1, DS2 and LC1 is described in WO 95/16007 (Example 35), DE 198 43 724 A1 (Example 1) and WO 97/00600 (Example 6), respectively.

Reactive compounds (component B)) used were 1,4-divinylbenzene (DVB; from Merck), styrene (S; from BASF Aktiengesellschaft), 4-vinylpyridine (VP; from Acros Organics), N-vinylformamide (NVFA; from BSF Aktiengesellschaft) and N-vinyl-2-pyrrolidone (NVP; from BASF Aktiengesellschaft).

Example 1

System Consisting of LC1, DVB and DS2

The compositions of matter consisting of LC1, DVB and DS2 are characterized in Table 1 below in terms of mol % (corresponding to the mole fraction of each component) and, for comparison, in terms of % by weight. The percentages are in each case based on the total mixture of the three components. $HTP_{(mol)}$ represents the HTP value based on the mole percentage of DS2, in contrast to the HTP value based on the weight fraction or volume fraction as otherwise customary in the relevant literature. Both here and in the series of mixtures described below, only relatively small mole fractions of the dopant (less than 6 mol %) were used, since it is known from experience that these values are in the range where $\lambda_R^{-1}$ linearly dependent on $x_{ch}$.

TABLE 1

| LC1 % | | DVB % | | DS2 % | | $HTP_{(mol)}$ |
|---|---|---|---|---|---|---|
| wt. | mol | wt. | mol | wt. | mol | (in $\mu m^{-1}$) |
| 96.9 | 97.7 | 0 | 0 | 3.1 | 2.3 | 85 |
| 90.8 | 75.7 | 4.8 | 21.6 | 4.4 | 2.7 | 96 |
| 85.5 | 61.9 | 9.0 | 35.3 | 5.5 | 2.8 | 112 |
| 82.2 | 53.5 | 12.5 | 44.0 | 5.3 | 2.5 | 123 |

The $HTP_{(mol)}$ value is linearly dependent on the DVB mole fraction. The homogeneous liquid-crystalline (lyotropic) phase consisting of LC1, DVB and DS2 is stable up to a DVB content of about 22% by weight and disintegrates at higher DVB contents. At this limiting DVB concentration, the $HTP_{(mol)}$ value is 137 $\mu m^{-1}$.

Example 2

System Consisting of LC1, S and DS2

As the molecular structure of styrene is similar to that of DVB, only one composition of matter comprising 48.1 mol % (83.5% by weight) of LC1, 50.4 mol % (12.9% by weight) of S and 1.5 mol % (3.6% by weight) of DS2 was analyzed, percentages being in each case based on the total mixture of the three components. The corresponding HTP$_{(mol)}$ value is 148 $\mu m^{-1}$. The homogeneous liquid-crystalline (lyotropic) phase consisting of LC1, S and DS2 becomes inhomogeneous at an S content of >16.7% by weight.

Example 3

System Consisting of LC1, VP and DS2

Percentages given in Table 2 are likewise based on the total mixture of the three components.

TABLE 2

| LC1 % | | VP % | | DS2 % | | HTP$_{(mol)}$ |
|---|---|---|---|---|---|---|
| wt. | mol | wt. | mol | wt. | mol | (in $\mu m^{-1}$) |
| 96.9 | 97.7 | 0 | 0 | 3.1 | 2.3 | 85 |
| 91.1 | 71.2 | 5.1 | 26.6 | 3.8 | 2.2 | 99 |
| 90.6 | 66.3 | 6.6 | 32.3 | 2.8 | 1.4 | 116 |
| 89.8 | 62.6 | 7.7 | 36.1 | 2.5 | 1.3 | 120 |
| 83.0 | 48.5 | 12.7 | 49.6 | 4.3 | 1.9 | 147 |

Similar to the styrene system described above, segregation was observed from a VP content of 17.7% by weight, i.e. the lyotropic phase, which is homogeneous up to that point, disintegrates.

Example 4

System Consisting of LC1, NVFA and DS2

The compositions of matter prepared from the components LC1, NVFA and DS2 have the compositions described in Table 3 below. Here too, percentages are in each case based on the total mixture of the three components.

TABLE 3

| LC1 % | | NVFA % | | DS2 % | | HTP$_{(mol)}$ |
|---|---|---|---|---|---|---|
| wt. | mol | wt. | mol | wt. | mol | (in $\mu m^{-1}$) |
| 96.9 | 97.7 | 0 | 0 | 3.1 | 2.3 | 85 |
| 91.5 | 58.4 | 5.1 | 40.0 | 3.4 | 1.6 | 138 |
| 87.0 | 41.5 | 9.8 | 57.4 | 3.2 | 1.1 | 189 |
| 81.8 | 33.7 | 12.7 | 64.7 | 5.5 | 1.6 | 200 |
| 81.0 | 32.1 | 13.5 | 66.3 | 5.5 | 1.6 | 206 |

The composition of matter having the highest NVFA content (13.5% by weight, 66.3 mol %) exhibits a phase behavior of N 45–56 I. i.e. the lyotropic (chiral) nematic phase changes into the isotropic phase in the temperature range from 45 to 56° C.

According to temperature behavior, this composition of matter should be suitable, for example, for pressure applications. In comparison to other reactive compounds tested, NVFA has the largest effect on the HTP$_{(mol)}$ value.

Example 5

System Consisting of LC1, NVP and DS2

In the systems described above, the HTP$_{(mol)}$ value was determined using uncrosslinked compositions of matter. The possible crosslinking-induced change in ETP$_{(mol)}$ value was also investigated. Three compositions of matter were prepared which had different NVP contents as indicated in Table 4 below. Two samples of each composition of matter were admixed with 2% of Irgacure 184 photoinitiator (based on the total mixture of LC1, NVP and DS2) in each case. One of the two samples was crosslinked, whereas the other remained uncrosslinked. Percentages are in each case based on the total mixture of the three components.

TABLE 4

| NVP mol % | LC1 mol % | DS2 mol % | $\lambda_R$ in nm (uncrosslinked) | HTP$_{(mol)}$ (uncrosslinked) | $\lambda_R$ in nm (crosslinked) | HTP$_{(mol)}$ (crosslinked) |
|---|---|---|---|---|---|---|
| 24.5 | 73.4 | 2.1 | 674 | 107 | 654 | 110 |
| 40.5 | 57.4 | 2.1 | 569 | 124 | 552 | 128 |
| 51.7 | 46.2 | 2.1 | 499 | 140 | 482 | 145 |

The small difference between the HTP$_{(mol)}$ value of the uncrosslinked system and that of the corresponding crosslinked system can be explained as an effect of shrinking of the material due to the crosslinking which has occurred. However, the differences between the HTP$_{(mol)}$ values of the uncrosslinked samples and that of the crosslinked samples are within the usual error limits in HTP determination.

Example 6

System Consisting of LC1, DVB and DS1

About 500 mg of LC1 were admixed with DVB and about 4% by weight of Irgacure 907 photoinitiator (based on the total amount of LC1, DVB and photoinitiator) and homogenized by dissolving in about 2.5 ml of acetone. 0.45 ml of this solution was introduced into each of six snap-cap vials containing different amounts (11.2, 9.6, 8.2, 6.4, 4,2 and 3.3 mg) of DS1. The acetone was evaporated at room temperature and the actual DVB content was determined to be 19% by weight (based on the mixture of LC1 and DVB) by thermal gravimetric analysis (Netzsch Simultaneous Thermoanalysis STA 40.9).

The compositions of matter containing 16% by weight of DVB (based on the mixture of LC1 and DVB) were prepared by a similar procedure.

The compositions of matter obtained were aligned in the cholesteric phase between two glass slides and photoroly-merized by means of UV light (UV lamp Amko LTI with Osram Xe short-arc lamp XBO 150 W) at 40° C. The reflected wavelength $\lambda_R$ was determined by means of a Hitachi U-300 or a Perkin-Elmer Lambda-19 UV/VIS/NIR spectrometer.

Percentages given in Table 5 are in each case based an the mixture of LC1 and DVB.

TABLE 5

| LC1 % by wt | DVB % by wt | HTP$_{(mol)}$ (in $\mu m^{-1}$) |
|---|---|---|
| 100 | 0 | 34.4 |
| 87.0 | 13.0 | 58.4 |
| 81.0 | 19.0 | 73.8 |

Example 7

Comparison of the Systems Consisting of LC1)DS2 and LC1/NVFA/DS2

Table 6 shows the reflected wavelength $\lambda_R$ in nm as a function of the concentration of dopant DS2 for the rare base material LC1 and a lyntropic composition of matter consisting of LC1 and NVFA in a polar ratio of 35.3: 64.7. The dopant concentration $x_{DS2}$ is indicated in mol % and based on the total number of moles of LC1, NVFA and DS2,

TABLE 6

| $X_{DS2}$ | $\lambda_R$ for LC1 | $\lambda_R$ for lyotropic mixture |
|---|---|---|
| 0.95 | — | 760 |
| 1.06 | — | 684 |
| 1.12 | — | 643 |
| 1.18 | — | 609 |
| 1.29 | — | 557 |
| 1.39 | — | 522 |
| 1.53 | — | 476 |
| 2.29 | 745 | — |
| 2.64 | 682 | — |
| 2.86 | 648 | — |
| 3.30 | 523 | — |
| 3.52 | 490 | — |
| 3.73 | 457 | — |

Table 6 shows that the proportion of chiral dopant DS2 in a composition of matter comprising LC1 and NVFA (molar ratio of 35.3/64.7%) can be reduced from about 2.2–3.8 mol % to about 1.0–1.5 mol % to achieve color effects in the visible wavelength range.

The compositions of matter according to the invention therefor make it possible to replace a significant proportion (in the case of NVFA up to about 65 mol %) of the liquid-crystalline base material with inexpensive reactive compounds. Another positive side effect is that the proportion of chiral dopant can be reduced at the same time without any undesired modification of the optical behavior compared to the pure (doped) base material.

We claim:

1. A liquid-crystalline composition of matter comprising, as compoents,
   A) at least one compound of the formula I $$Z^1-Y^1-A^1-Y^3-M-Y^4-A^2-Y^2-Z^2 \qquad I,$$

where the variables, independently of one another, have the following meanings:
   $Z^1$ and $Z^2$ are each a reactive group,
   $Y^1$ to $Y^4$ are each a chemical single bond, oxygen, sulfur, —O—CO—, —CO—O—, —O—CO—O—, —CO—NR—, —NR—CO—, —O—CO—NR—, —NR—CO—O— or —NR—CO—NR—,
   R is hydrogen or $C_1$–$C_4$-alkyl,
   $A^1$ and $A^2$ are each a spacer having from 1 to 30 carbon atoms, in which the carbon chain may be monosubstituted or polysubstituted by methyl, fluorine, chlorine or bromine and/or interrupted by ether oxygen, thioether sulfur or non-adjacent imino or $C_1$–$C_4$-alkylimino groups, and
   M is a mesogenic group,
   B) at least one reactive compound selected from the group consisting of the subgroups
   b5) vinylaromatics or vinylheteroaromatics, and
   b6) compounds of the general formula II $$CH_2=CH-NR^2-R^1 \qquad II,$$

where:

$R^1$ is $-\overset{\overset{\displaystyle O}{\|}}{C}-R^3$ or $R^3$, $R^2$ is hydrogen, $C_1$–$C_4$-alkyl or, together with $R_3$, a saturated or unsaturated $C_3$-, $C_4$- or $C_5$-alkylene bridge, in which up to two $CH_2$ groups may be replaced by NH, N($C_1$–$C_4$-alkyl), N($C_6$–$C_{10}$-aryl) or oxygen and up to two CH groups may be replaced by N, and
   $R^3$ is hydrogen, $C_1$–$C_4$-alkyl or a radical which, together with $R^2$, forms a saturated or unsaturated $C_3$-, $C_4$- or $C_5$-alkylene bridge, in which up to two $CH_2$ groups may be replaced by NH, N($C_1$–$C_4$-alkyl), N($C_6$–$C_{10}$-aryl) or oxygen and up to two CH groups may be replaced by N, and
   C) if desired, further additives.

2. A composition of matter as claimed in claim 1, wherein the at least one reactive compound is selected from the subgroup b5).

3. A composition of matter as claimed in claim 2, wherein the subgroup b5) comprises at least one member of the group consisting of 9-vinylcarbazole, styrene, α-methylstyrene, nitrostyrene, styrenesulfonic acid, vinyltoluene, divinylbenzene, vinylaniline, vinyiphenol, vinylpyridine, methylvinylpyridine and triallyl cyanurate.

4. A composition of matter as claimed in claim 1, wherein the at least one reactive compound is selected from the subgroup b6).

5. A composition of matter as claimed in claim 4, wherein the subgroup b6) comprises at least one member of the group consisting of N-vinylformamide, N-vinyl-2-pyrrolidone and N-vinyl-ε-caprolactam.

6. A composition of matter as claimed in claim 1, wherein at least one of $Z^1$ and $Z^2$ is a photopolymerizable group.

7. A composition of matter as claimed in claim 6, wherein the further additives comprise at least one photoinitiator.

8. A composition of matter as claimed in claim 1, wherein the further additives comprise at least one chiral compound.

9. A pigment which has been produced using a composition of matter as claimed in claim 7 or 8.

10. A printed or coated substrate which has been produced using a composition of matter as claimed in claim 1.

11. An optical component which has been produced using a composition of matter as claimed in claim 1.

12. A dispersion or emulsion which has been produced using a composition of matter as claimed in claim 1.

13. A film which has been produced using a composition of matter as claimed in claim 1.

14. A method of making a composition of matter, the method comprising mixing

A) at least one compound of the formula I $$Z^1—Y^1—A^1—Y^3—M—Y^4—A^2—Y^2—Z^2 \qquad I,$$

where the variables, independently of one another, have the following meanings:

$Z^1$ and $Z^2$ are each a reactive group, $Y^1$ to $Y^4$ are each a chemical single bond, oxygen, sulfur, —O—CO—, —CO—O—, —O—CO—O—, —CO—NR—, —NR—CO—, —O—CO—NR—, —NR—CO—O— or —NR—CO—NR—, R is hydrogen or $C_1$–$C_4$-alkyl, $A^1$ and $A^2$ are each a spacer having from 1 to 30 carbon atoms, in which the carbon chain may be monosubstituted or polysubstituted by methyl, fluorine, chlorine or bromine and/or interrupted by ether oxygen, thioether sulfur or non-adjacent imino or $C_1$–$C_4$-alkylimino groups, and M is a mesogenic group, B) at least one reactive compound selected from the group consisting of the subgroups b5) vinylaromatics or vinylheteroaromatics, and b6) compounds of the general formula II $$CH_2=CH—NR^2—R^1 \qquad II,$$

where:

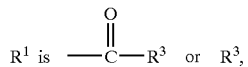

$R^2$ is hydrogen, $C_1$–$C_4$-alkyl or, together with $R_3$, a saturated or unsaturated $C_3$-, $C_4$- or $C_5$-alkylene bridge, in which up to two $CH_2$ groups may be replaced by NH, $N(C_1$–$C_4$-alkyl), $N(C_6$–$C_{10}$-aryl) or oxygen and up to two CH groups may be replaced by N, and $R^3$ is hydrogen, $C_1$–$C_4$-alkyl or a radical which, together with $R^2$, forms a saturated or unsaturated $C_3$-, $C_4$- or $C_5$-alkylene bridge, in which up to two $CH_2$ groups may be replaced by NH, $N(C_1$–$C_4$-alkyl), $N(C_6$–$C_{10}$-aryl) or oxygen and up to two CH groups may be replaced by N, and C) if desired, further additives; and producing the liquid-crystalline composition as claimed in claim 1.

* * * * *